US008466924B2

(12) United States Patent
De Greef

(10) Patent No.: US 8,466,924 B2
(45) Date of Patent: Jun. 18, 2013

(54) DISPLAYING ON A MATRIX DISPLAY

(75) Inventor: Petrus Maria De Greef, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 1421 days.

(21) Appl. No.: 10/587,604

(22) PCT Filed: Jan. 20, 2005

(86) PCT No.: PCT/IB2005/050232
§ 371 (c)(1), (2), (4) Date: Jul. 27, 2006

(87) PCT Pub. No.: WO2005/073955
PCT Pub. Date: Aug. 11, 2005

(65) Prior Publication Data

US 2007/0159490 A1 Jul. 12, 2007

(30) Foreign Application Priority Data

Jan. 28, 2004 (EP) .................................... 04100283

(51) Int. Cl.
*G06F 13/372* (2006.01)

(52) U.S. Cl.
USPC .......................................................... 345/534

(58) Field of Classification Search
USPC .......................................................... 345/534
See application file for complete search history.

(56) References Cited

U.S. PATENT DOCUMENTS

| | | | | |
|---|---|---|---|---|
| 5,764,240 | A | 6/1998 | Herz | |
| 6,028,586 | A * | 2/2000 | Swan et al. | 345/581 |
| 6,489,933 | B1 | 12/2002 | Ishibashi et al. | |
| 6,661,427 | B1 | 12/2003 | MacInnis et al. | |
| 2003/0164897 | A1 * | 9/2003 | Chen et al. | 348/459 |
| 2003/0184678 | A1 * | 10/2003 | Chen et al. | 348/511 |

FOREIGN PATENT DOCUMENTS

| | | | |
|---|---|---|---|
| EP | 0 875 882 | | 11/1998 |
| EP | 0 875 882 | A2 * | 11/1998 |
| EP | 1 143 331 | | 10/2001 |
| EP | 1193671 | A3 | 4/2002 |

* cited by examiner

*Primary Examiner* — Edward Martello
(74) *Attorney, Agent, or Firm* — Bruce Greenhaus; Richard Bachand; Duane Morris LLP

(57) ABSTRACT

A display method comprises the steps of generating (1) images comprising source data (SDA) and source frame synchronization instants (SSI) having a source frame rate (SFR). The source data (SDA) is stored (2) in a frame memory (5) under control of a first address pointer (AP I) having a start address (DSA) being determined by the source frame synchronization instants (SSI). During a read period (RP), display data (DDA) is read (2) from the memory (5) under control of a second address pointer (AP2) having a start address (SSA) being determined by display frame synchronization instants (DSI) having a display frame rate (DFR). The display data (DDA) is displayed (3) on a matrix display (4). The source frame rate (SIR) or the display frame rate (DFR) is controlled (2) to obtain, in a stable situation, the first address pointer (AP I) and the second address pointer (AP2) starting with an offset in time (TO) which has a fixed polarity during the read period (RP).

11 Claims, 6 Drawing Sheets

BLS
SVS
DSS
WP
FBP
WP'
SFP
DFP10
DFP20
DFP10
RP⁻
RP
RP'
I D
I D
ID'
SS I
SS I
N
N'
1
1'
DSI
DSI
DSI
t70
t71
t72
t73
t74
t75
t76
t77
t78
t79
t80
t81

DISPLAYING ON A MATRIX DISPLAY

FIELD OF THE INVENTION

The invention relates to a display method and a display system. The display system comprises both an image source and a matrix display on which the image from the image source is displayed such as a multi-media mobile phone and/or a handheld computer. The image source may (but does not need to be) a camera embedded in the display system.

BACKGROUND OF THE INVENTION

U.S. Pat. No. 5,764,240 discloses a video and graphics display system which compensates for video tearing caused by reading graphics data from a shared buffer faster than video data is stored into the shared buffer. The video data is arranged in video fields comprising scan lines of pixel data. A processor determines the scan line of overtake of reading graphics data from the buffer at a rate faster than storing video data of a current video field into the buffer. A generator provides at least one video scan line as an interpolation of at least one scan line of the current video field stored in the shared buffer and of at least one scan line of a previous video field stored in the shared buffer. A multiplexer receives video scan lines from the shared buffer and from the generator and provides the video scan lines from the shared buffer to a display if there is no scan line of overtake and provides the interpolated video scan lines from the generator to the display if there is a scan line of overtake.

SUMMARY OF THE INVENTION

It is an object of the invention to provide a display method which prevents the video tearing effect from occurring without requiring a video interpolator.

The invention is defined by the independent claims. Advantageous embodiments are defined in the dependent claims.

The display method in accordance with the invention comprises the step of generating input images comprising source data and source frame instants which occur at a source frame rate. The input images are build up of frames of video lines. The frames are also referred to as fields. The source frames succeed at each other at the source frame rate. The video lines of the input image are further referred to as source video lines, the frames of the input image are further referred to as source frames. The start of a source frame is indicated by a source frame synchronization pulse which more in general is referred to as the source frame synchronization instant. The source data represents the input image. For example, the input images may be supplied by a camera or via a communication link.

The method further comprises the step of storing the source data in a frame memory under control of a first address pointer, a start address of the first address pointer is determined by the source frame synchronization instant. For example, if the memory stores N video lines, the source frame synchronization instant, which indicates the start of a frame of source video lines, causes the first address pointer to point to the first line of the memory and the first line of the source video is written into this first line of the memory. When the second line of the source video has to be written into the memory, the address pointer is changed to point to the next line of the memory, and so on until the last line of the source video is written to the last line of the memory. The first line of the next frame of the source video will again be written to the first line of the memory, and so on. The memory need not actually be organized in lines of video. It suffices that the writing and reading both perform the same sequence of addressing.

The method further comprises displaying video on a matrix display. The video to be displayed on the matrix display is referred to as display data or display image which comprises frames of lines which are referred to as display frames and display lines, respectively. Usually, a select driver is controlled to select the lines of pixels of the matrix display one by one while a data driver supplies data signals in parallel to the selected line of pixels. A start of the display frames is indicated by a display frame synchronization instant which occurs at a display frame rate. The display data is read from the memory under control of a second address pointer, a start address of the second address pointer is determined by the display frame synchronization instant. The display images which have to be displayed on the matrix display are read from the same frame memory in which the input images are stored. The period in time during which the data on the matrix display is actually read from the memory is referred to as the read period. The total refresh period of the displayed image may be equal to this read period. However, if an idle period is present between two successive read periods, the refresh period of the display is the sum of the read period and the idle period. Such an idle period may be present to be able to randomly update the image without interfering with the read period. This may be especially relevant in mobile applications, such as, for example, a handheld telephone with an on-board camera.

As disclosed in U.S. Pat. No. 5,764,240, usually, the first address pointer and the second address pointer are asynchronous with respect to each other. It may occur that the reading of the video frame from the memory overtakes the storing of the next video frame in the memory. If the video data is stored in the shared frame memory at a rate slower than the rate the display driver is reading the video data from the memory, initially, the storing of the video lines of the next video frame is ahead of the retrieval of the video lines of the previously stored video frame. Thus, at the top of the display, the video of the previously stored frame is displayed. However, at the instant the reading of the video lines overtakes the writing of the video lines, the next video frame will be displayed. Thus, the next video frame is displayed from the overtake point towards the bottom of the display. This may cause a shift between the displayed video image in the upper portion of the display and the displayed video image in the lower portion of the display if the video images of the two successive frames differ. This shift is referred to as the video tearing.

In accordance with the invention, the source frame rate or the display frame rate is controlled to obtain a first address pointer and a second address pointer which, in a stable situation, start with an offset in time which has a fixed polarity during the read period in time. Thus, either the frame rate of the video source is controlled or the frame rate of the matrix display is controlled such that the address pointers will not overtake each other during the read period. That the address pointers will not overtake is clear from the fact that they start with an offset of which the polarity does not change. Thus if the first pointer lags the second pointer at the start of the reading of the display frame of data from the memory, the first pointer still lags the second pointer at the end of the reading of this display frame of data.

It is clear for the skilled person that the non changing polarity of the offset can be reached in many ways. For example, the frame rates of the video source and the display may be controlled to become substantially equal while the phase of these frames is controlled to have a fixed relation.

This is possible with a well known hardware or software Phase Locked Loop. However, the phase need not have a fixed relation, the phase may vary as long as no overtake occurs. If the read out frequency of the memory is twice the write frequency, still it is possible to prevent an overtake to take place during the read period. However, now the control of the frame rate and the phase has to be more stringent as will become clear from embodiments in accordance with the invention.

It is also clear for the skilled person how the frame rate can be influenced. Usually, the frame rate is determined by the number of lines in a frame and by the duration of the lines (which is also referred to as line period). Usually, a line counter is used to count clock pulses to determine the line period, and the frame period is determined by counting the lines. Thus, the frame rate can be influenced by changing the clock frequency, the number of clock pulses to be counted in a line, the number of lines to be counted in a frame, or combinations of these possibilities. If an idle time is present between two successive read periods, also the duration of this idle time may be controlled.

It has to be noted that the first and second address pointers may overtake each other outside the read period when the display is not updated and thus the overtake is not visible.

In accordance with the invention it is possible to prevent the occurrence of an overtake during the read period by controlling the frame rate of the video source or of the matrix display. The interpolator used in the prior art U.S. Pat. No. 5,764,240 is not required.

It has to be noted that it is common practice to display a video signal of a source with a frame rate different than the frame rate of the matrix display on the matrix display. But, usually, the frame rate of the matrix display is fixed and a scaler is used to convert the source video signal into a video signal suitable to be displayed on the matrix display. Such a scaler interpolates the input video, or drops input frames. In accordance with the invention, preferably, the frame rate of the matrix display is varied to fit the frame rate of the video source.

In an embodiment, the display rate is controlled to obtain a second pointer which is always lagging with respect to the first pointer during the read period in time, or the other way around. This can be reached by comparing the source frame rate and the display frame rate and by varying the source frame rate or the display rate accordingly. For example, if the second pointer is lagging the first pointer, and the display frame rate is higher than the source frame rate, the display frame rate is decreased, and the other way around. The exact phase relation is not important, as long as the pointers do not cross during the read period no tearing will occur.

In an embodiment, the frame rate of the source or display is controlled to obtain a frame rate of the source and display which are substantially identical. Further, the difference in time of the instants of occurrence of immediately successive frame synchronization instants of on the one hand the source and on the other hand the display is determined to keep this difference substantially constant. This has the advantage that the phase relation between the first and the second pointer is fixed, and thus it is impossible that an overtake occurs during the read period.

In an embodiment, the time difference between the first pointer and the second pointer is substantially equal to half a source frame period. In this manner the phase margin is optimal. The phase of the frame synchronization instants of the source and display may vary over about half a frame before an overtake occurs. Thus, plenty of time is present to correct for a phase shifts.

In an embodiment, a clock frequency of a driver of the matrix display is varied. The display frame period is determined by counting a predetermined number of clock pulses. As explained earlier, this clock frequency thus influences the duration of the display frame period if the number of lines in a frame is kept constant.

In an embodiment, a clock frequency of a driver of the matrix display is varied. As explained earlier, this clock frequency may influence the duration of the display line period and thus the duration of the display frame period if the number of lines in a frame is kept constant.

In an embodiment, the duration of the display frame period is varied by adapting the duration of the line period of the display lines by changing the number of clock pulses to be counted in a line counter of the display driver.

In an embodiment, the display frames comprise a read period during which the data in the memory is read to update the image displayed on the matrix display and an idle period during which no data is read from the memory and the display on the matrix display is not changing. Such an idle period may be present to be able to randomly update the image without interfering with the read period. Now, the display frame rate can be varied by varying the duration of the idle period.

In an embodiment, the display frame rate is controlled to become substantially identical to two times the source frame rate. This is especially relevant if the frame rate of the source is too low to prevent frame flicker if the display rate has the same low rate. The amount of flicker is decreased or prevented completely by doubling the display rate with respect to the source frame rate. The phase between the source frame synchronization instants and the display frame synchronization instants is controlled to read the first line of a present video frame from the memory under control of the second pointer before the first line of the next video frame is written under control of the first address pointer. When the first line of the next video frame is read under control of the second pointer, the first pointer proceeded with the filling of the next video frame in the memory to about half way the address space of the memory. When the last line of the next video frame is read under control of the second pointer, the first pointer must have controlled the write process to already store the last line of the next video frame in the memory. Then, after the last line of the next video frame is read, thus outside the read period, the second pointer has to overtake the first pointer to be leading again at the start of the succeeding frame. In this embodiment in accordance with the invention, it is thus possible to read the data from the memory at two times the speed the data is written into the memory without causing a tearing effect.

In an embodiment, the display frames comprise the read period during which the data in the memory is used to update the image displayed on the matrix display and the idle period during which no data is read from the memory. The frame rate of the display is controlled to obtain a free running frame rate, occurring when no source signal is present, which is lower than the frame rate of the source. The duration of the read period is shorter than the frame period of the source. Thus, in a stable situation, the source frame synchronization instant will occur during the idle period. The occurrence of the source frame synchronization instant causes a reset of the display frame and thus triggers the start of the next display frame. The start of the display frame has a fixed relation with the source synchronization instant, the second address pointer has a fixed offset with respect to the first pointer, and, consequently, in the stable situation no overtake will occur.

If the stable situation is not reached, still, the occurrence of the source synchronization instant triggers a restart of the display frame. If the source synchronization instant occurs before the idle period is started, and the system is starting up, the next source synchronization instant will occur in the idle period if the display frame rate is correctly somewhat higher than the source frame rate. The display frame rate should be adjusted if the source synchronization instant does repeatedly occur outside the idle period. If the source synchronization instant occurs after the idle period, the duration of the idle period should be enlarged.

In an embodiment, the display frame rate is substantially equal to two times the source frame rate. Now, if a source frame synchronization instant occurs, the display frame is restarted and if no source frame synchronization occurs the free running display frame period occurs.

These and other aspects of the invention are apparent from and will be elucidated with reference to the embodiments described hereinafter.

DETAILED DESCRIPTION OF THE PREFERRED EMBODIMENT

Figure 1:
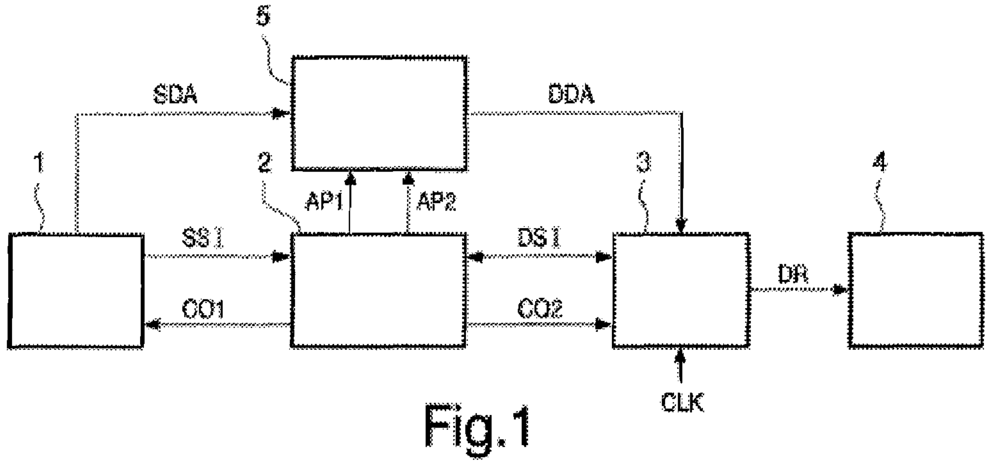
FIG. 1 shows a block diagram of a system for displaying an image supplied by an image source on a matrix display in accordance with the invention.

FIG. 1 shows a block diagram of a system for displaying an image supplied by an image source on a matrix display in accordance with the invention. An image source 1 supplies source images which comprise source data SDA and source synchronization signals SSY (see FIG. 2). The source synchronization signals SSY comprise the source frame synchronization instants SSI. The image source 1 is, for example, a digital camera. Alternatively, if the digital camera is not part of a cell phone, but an accessory that can be connected to ("clicked on") the cell phone, the image source 1 is the connector terminal of the cell phone. In yet another alternative embodiment, the image source 1 is an antenna that receives images. All these embodiments are explicitly within the scope of the claimed invention. A display driver 3 supplies drive signals DR to drive the matrix display 4 to display a display image. Usually, the matrix display 4 has a native resolution which differs from the resolution of the source data SDA. The resolution of the source data SDA and the matrix display 4 is defined by the number of pixels in a line and the number of lines in a frame. If the resolution of the source data SDA and the display 4 is identical, the source data SDA can be displayed directly on the display 4, but only if the source data SDA has to cover the complete display array of the display 4. Often, other information has to be displayed on the display 4 adjacent to the source data SDA.

In the prior art, if the resolution of the source data SDA and the resolution of the available area on the display 4 differ, the resolution of the source data SDA has to be converted into the resolution of the available area before it is stored in a memory 5. Usually, in the prior art, the memory is able to store two frames of information. The write pointer AP1 controls the storing of the source data in one of the memories. The read pointer AP2 controls the reading of the display data from the other one of the memories. The write pointer AP1 is locked to the synchronization pulses SSY of the image source and the pointer AP2 is locked to the synchronization of the display 4. It is not a problem that the pointers AP1 and AP2 are asynchronous, but two frame memories are required.

In accordance with the invention, the memory 5 only has to store one frame, and either the frame rate of the image source 1 or the frame rate of the display driver 3 is changed such that the write pointer AP1 and the read pointer AP2 have a predetermined relation. This predetermined relation is selected such that the write pointer AP1 and the read pointer AP2 will not cross each other during the read period the display data DDA is read from the memory 5. When the pointers AP1 and AP2 cross, a different source frame will be displayed before and after the cross, and, consequently, the tearing effect occurs. To prevent the tearing effect, the read pointer AP2 has to either precede or succeed the write pointer during the whole read cycle of the memory 5. Thus, if the first line of display data DDA read from the memory 5 occurs before the first line of a source data SDA is written into the memory 5, also the second line of display data DDA should be read from the memory 5 before the second line of the source data SDA is written into the memory 5, and so on.

The source data SDA is stored in the memory 5 under control of the write pointer AP1 which is generated by a controller 2. The write pointer AP1 points to address locations of the memory 5 to sequentially store a frame of the source data SDA. The controller 2 receives the source frame synchronization instant SSI to define the start address of the write pointer AP1. The sequence the source data SDA is stored in the memory 5 is not relevant, as long as the stored data is read out with the same sequence. Usually, the source data SDA is stored line wise and the source frame synchronization instant SSI causes the write address pointer AP1 to point to the first line of the memory 5 to store the first line of the source data SDA. Source line synchronization instants (not shown) of the source synchronization signals SSY control the increase of the write address pointer AP1 such that it points to the next line of the memory when a next line of the source data SDA has to be stored.

The source data SDA is read from the memory 5 under control of the read pointer AP2. The data read from the memory 5 is referred to as display data DDA but is actually equal to the source data SDA stored. A start instant of the read pointer AP2 is determined by the display frame synchronization instants DSI. The display frame synchronization instants DSI cause the read address pointer AP2 to point to the first line of the memory 5 to read this line of display data DDA.

Display line synchronization instants (not shown) accompany the display frame synchronization instants DSI to control the increase of the read address pointer AP2 such that it points to the next line of the memory when a next line of the display data DDA has to be read.

In one embodiment in accordance with the invention, the controller 2 receives display frame synchronization instants DSI from the display driver 3 and defines a start instant of the read pointer AP2 based on these display frame synchronization instants DSI. Thus now, the reading from the memory 5 is locked to the display synchronization. The control signal CO1 generated by the controller 2 controls the frame rate of the image source 1 to obtain the predetermined relation between the synchronization instants SSI and DSI and thus between the pointers AP1 and AP2.

In another embodiment in accordance with the invention, the controller 2 supplies the display frame synchronization instants DSI to the display driver 3. The controller 2 controls the frame rate of the display driver 3 with the display frame synchronization instants DSI or with a separate control signal C02 to obtain the predetermined relation between the synchronization instants SSI and DSI and thus between the pointers AP1 and AP2.

Usually, the display driver 3 receives a clock signal CLK to clock the internal processes. The operation of the system will be elucidated in more detail in FIG. 2.

Figure 2:
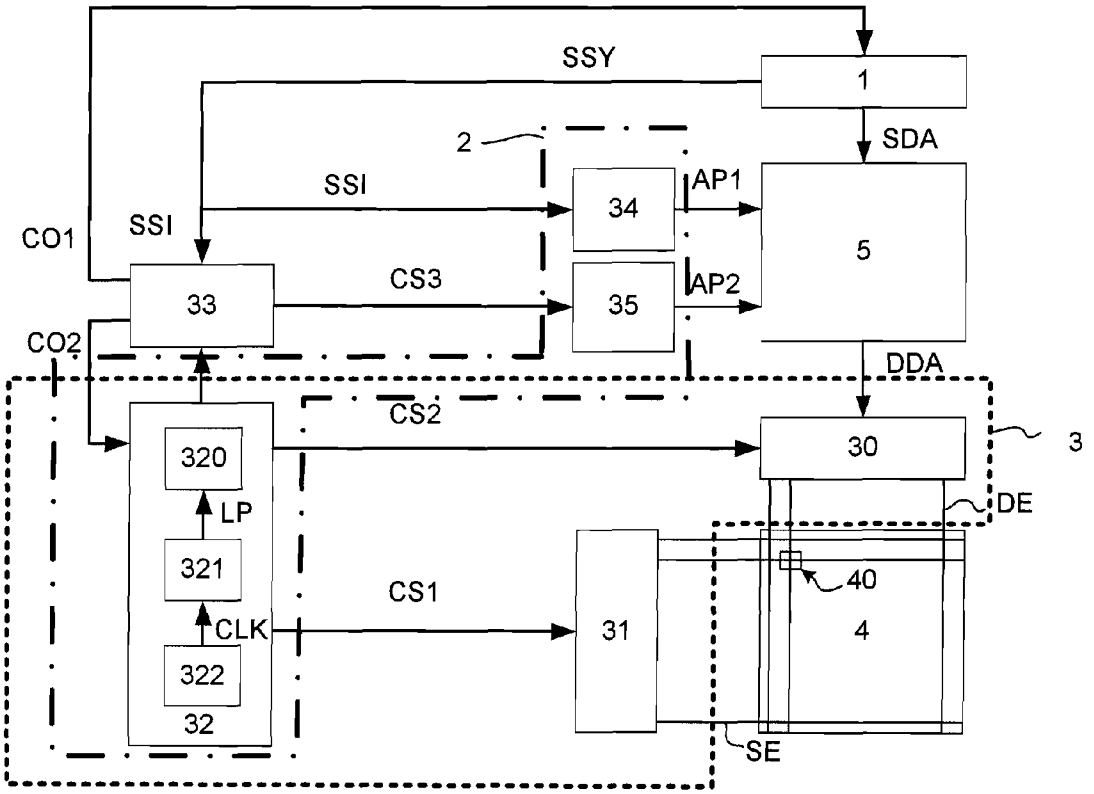
FIG. 2 shows a more detailed block diagram of the system for displaying the image supplied by the image source on the matrix display.

FIG. 2 shows a more detailed block diagram of the system for displaying the image supplied by the image source on the matrix display. FIG. 2 is elucidated with respect to a handheld wireless communication device which comprises the camera 1 as the image source and the TFT active matrix display 4 as the display.

The camera 1 supplies the source data SDA and the line and frame synchronization signals SSY. The synchronization signals SSY may be pulses or time indicating codes. The source data SDA is written into the memory 5 under control of the write address pointer AP1 (also referred to as write pointer), the source data SDA is read from the memory 5 as the display data DDA under control of the read address pointer AP2 (also referred to as read pointer).

A select driver 31 receives a control signal CS1 to supply select signals to the select electrodes SE of the matrix display 4. A data driver 30 receives the display data DDA and a control signal CS2 to supply data signals to the data electrodes DE of the matrix display 4. Pixels 40 are associated with intersections of the data electrodes DE and the select electrodes SE. Usually, the select electrodes SE are selected one by one and the data signals which are supplied to the columns of pixels 40 will only influence the pixels 40 associated with the selected one of the select electrodes SE.

The timing and synchronization generator 32 (further referred to as timing generator) supplies a display synchronization signal and the control signals CS1 and CS2. The display synchronization signal at least comprises the display frame synchronization instants DSI representative for the frame scan of the display 4. The display frame synchronization instants DSI are indicative for an instant in time the first row of pixels 40 associated with the first select electrode SE of the display 4 is selected. Usually, the first select electrode SE is the top select electrode SE of the display 4. A possible embodiment of the timing generator 32 is shown to comprise a clock generator 322, a line counter 321, and a frame counter 320. The clock generator 322 generates the clock signal CLK. The line counter 312 counts a predetermined number of clock pulses of the clock signal CLK to obtain a line pointer LP. Usually, the line pointer LP indicates the start of the display lines. The display line synchronization pulses may be or may be related to this line pointer. The frame counter 320 counts a predetermined number of the line pointer LP to generate the display frame synchronization signal DSI indicative for the start of a display frame on the display 4. Usually, the control signal CS1 comprises the display frame synchronization instants DSI and the line pointer LP to allow the select driver 31 to select the select electrodes SE one by one, starting with the first one a predetermined period in time after the frame synchronization instant DSI is received. The control signal CS2 should at least comprise the line pointer LP, to enable the data driver 30 to receive the next row of data to be displayed on the next display row.

The controller 33 receives the display frame synchronization instants DSI, and the source frame synchronization instants SSI. The controller 33 compares the display frame synchronization instants DSI and the source frame synchronization instants SSI, and determines the required adaptation of either the display frame rate or the source frame rate required such that the write pointer AP1 and the read pointer AP2 will not cross each other during the read period.

The controller 33 may change the frame rate of the camera 1 with the control signal CO1. The controller 33 may change the frame rate of the display driver with the control signal CO2 which is supplied to the timing generator 32. The write address pointer generating circuit 34 receives the source synchronization signal SSY to generate the write address pointer AP1. The source frame synchronization instant SSI indicates the start of a store cycle. The source line synchronization signal controls the storage of the lines of source data SDA. The read address pointer generating circuit 35 receives a control signal CS3 from the controller 33 to obtain the address pointer AP2 which points to the lines of stored data to be retrieved from the memory 5.

The display driver 3 (see FIG. 1), which comprises the data driver 30, the select driver 31 and the timing generator 32 is as such well known. In accordance with the embodiment of the invention wherein the display frame rate is controlled, the timing generator 32 further receives a control signal CO2. The control signal CO2 may vary the display frame rate in many ways. For example, the control signal CO2 may vary the clock frequency of the clock generator 322. The display frame rate increases if the clock frequency is increased. Alternatively, the control signal CO2 may influence the line counter 321, by changing the predetermined number of clock pulses to be counted. In this manner it is possible to vary the duration of the line periods, and thus the display frame rate if the number of lines in a frame is constant. Alternatively, the control signal CO may influence the frame counter 320, by changing the number of lines to be counted, or by varying an idle time. The idle time is the period of time between two successive read periods of the display frame scans (see, for example, FIG. 4). Thus, during the read period of a particular display frame period, the rows of pixels 40 are selected one by one until all rows have been selected once. During the idle period of this particular display frame period, the display 4 is not addressed. Consequently, the duration of the display frame period can be varied by varying the duration of the idle period.

The frame rate of the camera 1 may be varied by the control signal CO1 in a similar manner as is discussed with respect to the variation of the frame rate of the display.

Figure 3:
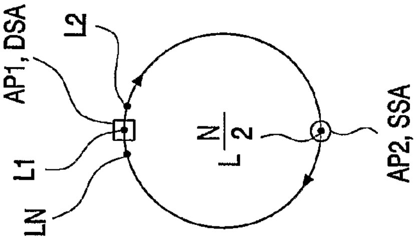
FIG. 3 shows the address pointers in the address space of the memory in accordance with an embodiment of the invention.

FIG. 3 shows the read and write address pointers in the address space of the memory in accordance with an embodiment of the invention. The memory 5 stores the source data SDA sequentially on addresses indicated by the write address pointer AP1. By way of example, in FIG. 3 it is assumed that the source data SDA is stored line by line. The addresses of the lines of the memory are indicated by L1, L2 to LN. Of a same particular frame of source data SDA, the first line of source data SDA is stored in the first line L1 of the memory 5, and the last line of source data SDA is stored in the last line LN of the memory 5, respectively. Of the next frame of source data SDA, again the first line is stored on the start address L1 and the last line is stored on the address LN of the memory. Thus, the addresses L1 to LN of the memory 5 are cyclically addressed by the write address pointer AP1 to store the frames of the source data SDA. In the same manner, the addresses L1 to LN of the memory 5 are cyclically addressed by the read address pointer AP2 to read the stored source data SDA as display data DDA from the memory 5.

The write address pointer AP1 is indicated by a square around the address L1. The read address pointer AP2 is indicated by a circle around the address LN/2 (or the address nearest to LN/2 if LN/2 is not an integer). In the example shown in FIG. 3, the address pointer AP1 starts at the start address DSA which is the first line of the memory 5, indicated by L1. The address pointer AP2 has the start address SSA which is the line of the memory 5 indicated by LN/2. Thus, when the address pointer AP1 is pointing to the address L1, the first line of a particular frame of source data SDA is written on this address into the memory 5. At substantially the same time, the address pointer AP2 is pointing to the address LN/2 to read the line LN/2 from the frame of source data SDA stored in the frame preceding the particular frame.

As long as the address pointer AP2 leads the address pointer AP1, the source data SDA of the same frame is read successively and no tearing will occur. Or said differently, to prevent tearing, the address pointers AP1 and AP2 may not overtake each other during a read cycle during which the display data DDA is read from the memory 5. Therefore, the address pointers AP1 and AP2 have to sequentially pass along the addresses L1 to LN in the same direction, as in indicated by the arrows. In the example shown, both address pointers AP1 and AP2 move clock wise to address the lines sequentially with increasing number. In the example shown, it is assumed that, in the nominal case, the address pointers AP1 and AP2 have a maximum distance LN/2. If the speed of movement of the address pointers AP1 and AP2 temporarily varies with respect to each other, the maximum margin is present to prevent the pointers AP1 and AP2 to cross. Off course it is possible to select a smaller margin, especially if the locking of the speed of movement of the address pointers AP1 and AP2 is locked to a high degree.

Figures 4A, 4B, 4C:
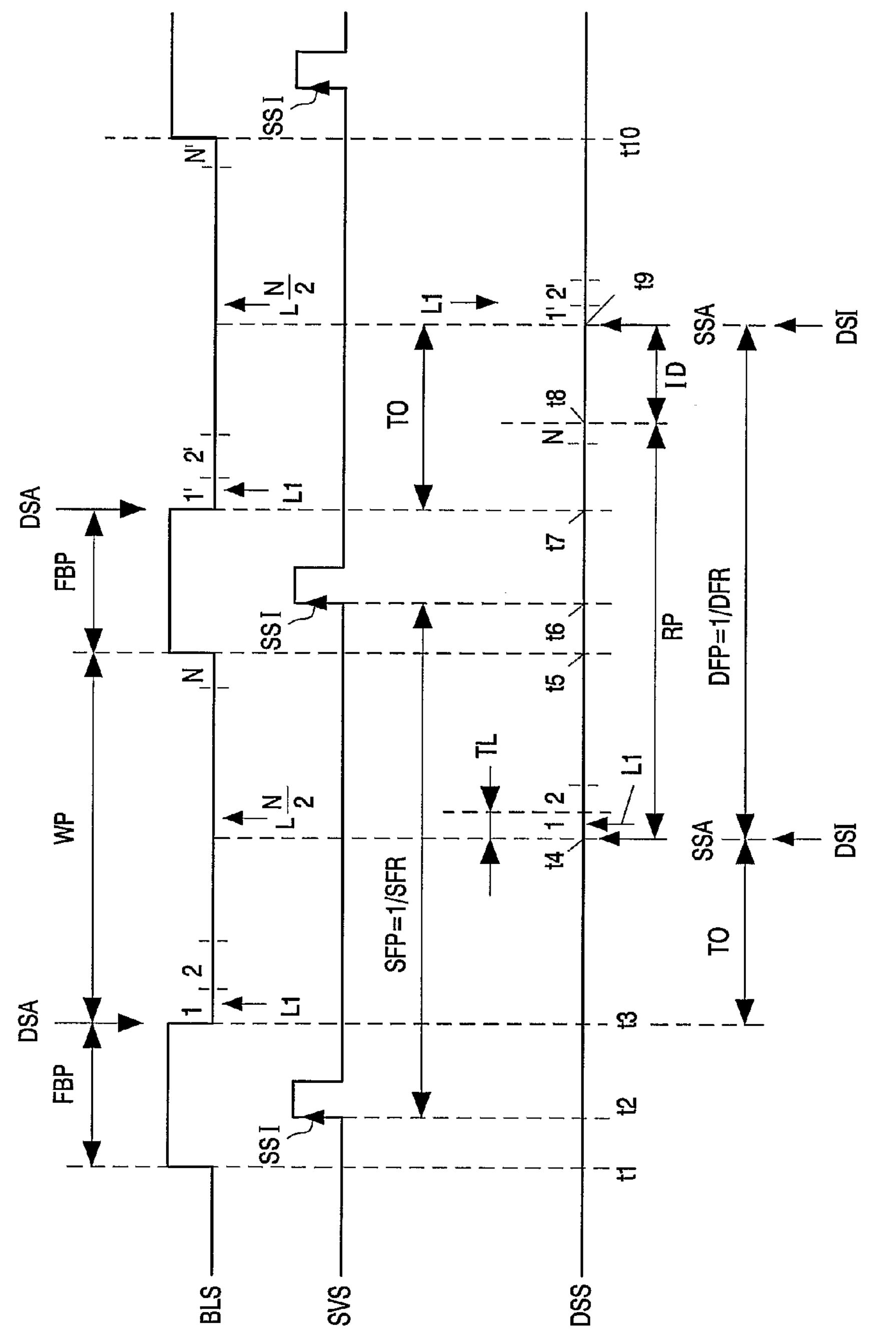
FIGS. 4A to 4C show a timing diagram elucidating the relation of the address pointers as obtained by controlling the frame rate of the display in accordance with an embodiment of the invention.

FIG. 4 show a timing diagram elucidating the relation of the address pointers as obtained by controlling the frame rate of the display in accordance with an embodiment of the invention. FIG. 4A shows a graph BLS indicating the frame blanking periods FBP of the source images. The line blanking periods are not shown. FIG. 4B shows the source frame synchronization signal SVS. FIG. 4C shows the display synchronization signal DSS.

At the instant t1, the frame blanking FBP starts. At the instant t2, the rising edge of the vertical synchronization pulse SVS indicates the source frame synchronization instant SSI of a particular frame of source data SDA. This source frame synchronization instant SSI indicates the start instant t3 of the first line 1 of the source data SDA of the particular frame. This particular frame has the lines 1 to N. Thus, the address pointer AP1 points at the instant t3 to the first line L1 of the memory 5 to store the first line 1 of the particular frame of source data SDA in the memory 5. The last line LN of the memory 5 is addressed just before the instant t5 at which the next source frame blanking FBP starts. Thus all the lines 1 to N of the particular frame of the source data SDA are stored into the memory 5 during the write period WP lasting from instant t3 to instant t5. The next source frame blanking FBP ends at the instant t7. The source frame synchronization instant SSI at the instant t6 indicates the next frame of source data SDA which has the lines 1' to N'. The first line 1' of this next frame of source data SDA is again written on address L1 of the memory 5. The last line N' of this next frame of source data SDA is again written on address LN of the memory 5. The last line N' has been written at the instant t10 when again a next frame blanking starts. The source frame period SFP lasts from the instant t2 to the instant t6 and is the reciprocal of the source frame rate SFR.

At the instant t4, or a predetermined period of time before the instant t4 a display frame synchronization instant DSI occurs. At the same instant t4, the occurrence of the display frame synchronization instant DSI causes the start address SSA of the address pointer AP2 to point to the first line L1 of the memory 5 and to read the stored first line 1 of source data SDA from the memory 5. It has to be noted that at the instant t4 the address pointer AP1 points to the address LN/2 of the memory 5 to write the line N/2 of the particular frame of source data into the memory 5. Thus, as shown in FIG. 3, the offset between the address pointers AP1 and AP2 is LN/2 which is the optimal value. This offset is in the time space the time offset TO which indicates the difference in time between the instant t3 the address pointer AP1 and the instant t4 the address pointer AP2 addresses the same line L1 of the memory 5. During the read period RP, which in the example shown in FIG. 4 lasts from the instant t4 to the instant t8, all the lines L1 to LN of the memory 5 are addressed to sequentially read the stored lines 1 to N of the source data SDA as display data DDA from the memory 5.

If the time offset TO is kept constant, in the next frame, the line L1 of the memory 5 is addressed by the address pointer AP1 at the instant t7 to write the line 1' into the memory 5, and the line L1 of the memory 5 is addressed by the address pointer AP2 at the instant t9 to read the line 1' from the memory 5. The idle time between the instants t8 and t9 is referred to as the idle period ID. The duration of the idle period ID may be selected between zero and a maximum value. The maximum value occurs when the address pointer AP2 is increased as fast as possible, but not so fast that the line N is read before it is stored. The display frame period DFP lasts from instant t4 to instant t9 and is the reciprocal of the display frame rate DFR.

From FIGS. 3 and 4 it becomes clear that it is possible to prevent the tearing effect by preventing the address pointers AP1 and AP2 to overtake each other during the read period RP. Thus, the tearing effect is prevented if either the source frame rate SFR or the display frame rate DFR is controlled to obtain a relation which prevents the address pointers AP1 and AP2 to overtake each other during the read period RP. In the example shown in FIGS. 3 and 4, the source frame rate SFR and the display frame rate DFR are controlled to be identical while an optimal phase difference indicated by the time offset TO is reached.

The display frame rate DFR may be controlled by varying the idle time ID, or by varying the duration of the read period RP.

FIGS. 5A to 5E show the address pointers in the address space of the memory in accordance with an embodiment of the invention, in a same manner as in FIG. 3. Now, the display frame rate DFR is substantially twice the source frame rate SFR. FIG. 5 show the address pointer positions of the address pointers AP1 and AP2 at five different instants. Again, the squares indicate the positions of the address pointer AP1, and the circles indicate the positions of the address pointer AP2 in the address space of the memory 5.

Figure 5A:
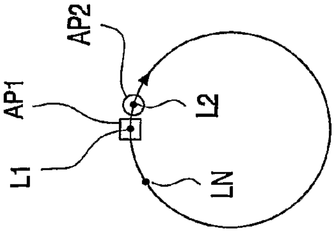
FIGS. 5A to 5E show the address pointers in the address space of the memory in accordance with an embodiment of the invention.
Figure 5B:
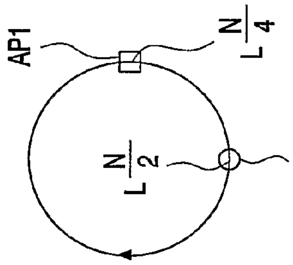
Figure 5C:
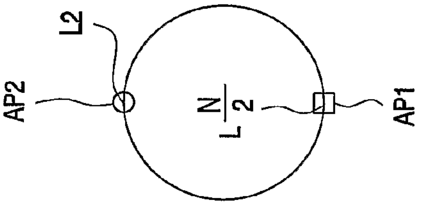
Figure 5D:
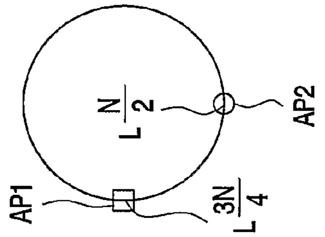
Figure 5E:
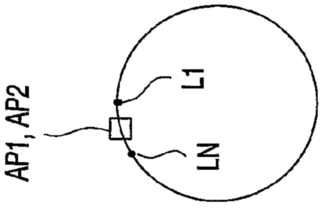

FIG. 5A shows the starting situation at the start of a frame of lines of the source data SDA. The address pointer AP1 is pointing to line L1 of the memory 5 to write the line 1'(see FIG. 6) of the present frame of the source data SDA into the memory 5, and the address pointer AP2 is pointing to the line L2 to read the line 2 (see FIG. 6) of the previous frame of the source data SDA from the memory 5. Both the address pointers AP1 and AP2 move clockwise. The read pointer AP2 moves about double the speed of the write pointer AP1 because the display frame rate DFR is substantially twice the source frame rate SFR. In FIG. 5B, the write address pointer AP1 has proceeded to the address LN/4 while the read address pointer AP2 has proceeded to the address LN/2. In FIG. 5C, the write address pointer AP1 has proceeded to the address LN/2 while the read address pointer AP2 has proceeded to the address L2. In FIG. 5D the address pointer AP1 has proceeded to the address L3N/4 while the address pointer AP2 has proceeded to the address LN/2. And finally, in FIG. 5E the address pointers AP1 and AP2 cross each other in between the addresses LN and L1 such that they will start for a next source frame again as shown in FIG. 5A.

FIGS. 5A to 5E thus illustrate an embodiment in accordance with the invention wherein the display frame rate DFR is substantially twice the source frame rate SFR and wherein the source frame rate SFR and the display frame rate DFR have a relation such that the address pointers AP1 and AP2 do not cross each other during a read cycle. Consequently, even in this embodiment, no tearing occurs. The higher display frame rate DFR may be relevant to decrease flicker effects or to decrease the source frame rate to lower the power consumption.

Figures 6A, 6B, 6C:
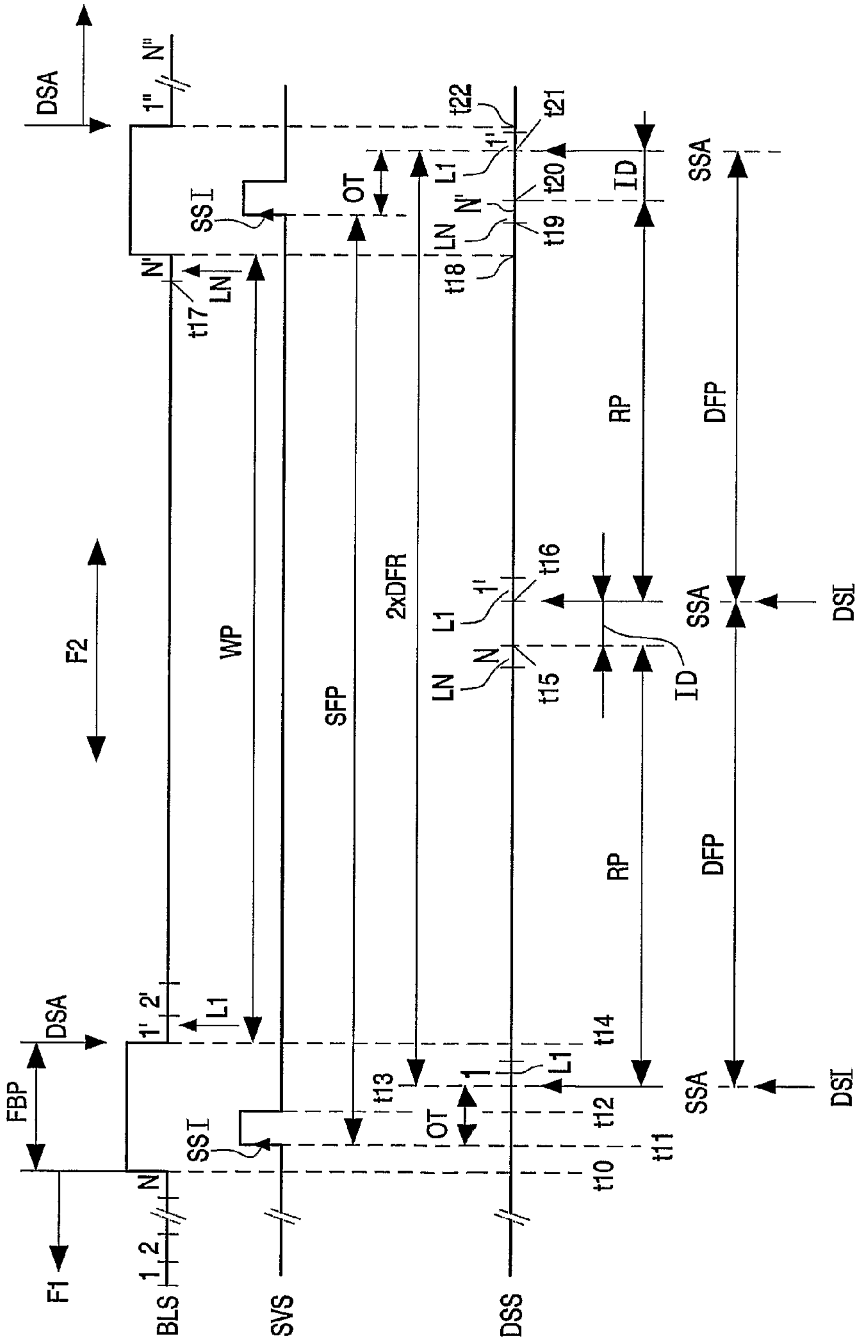
FIGS. 6A to 6C show a timing diagram elucidating the relation of the address pointers as obtained by controlling the frame rate of the display in accordance with an embodiment of the invention.

FIGS. 6A to 6C show a timing diagram elucidating the relation of the address pointers obtained by controlling the frame rate of the display in accordance with an embodiment of the invention. FIG. 6A shows a graph BLS indicating the frame blanking periods FBP of the source images. The line blanking periods are not shown. FIG. 6B shows the source frame synchronization signal SVS. FIG. 6C shows the display synchronization signal DSS.

At the instant t10, the frame blanking FBP starts. At the instant t11, the rising edge of the vertical synchronization pulse SVS indicates the source frame synchronization instant SSI of a particular frame F2 of source data SDA which lasts from the instant t14 to the instant t21. This source frame synchronization instant SSI indicates the start instant t14 of the first line 1' of the source data SDA of the particular frame F2. The frame F2 has the lines 1', 2' . . . N'. Thus, the address pointer AP1 points at the instant t14 to the first line L1 of the memory 5 to store the first line 1' of the particular frame of source data SDA in the memory 5. The last line LN of the memory 5 is addressed at the instant tl7, just before the instant t18 at which the next source frame blanking FBP starts, to store the line N' of the source data SDA of the frame F2. Thus all the lines 1' to N' of the particular frame F2 of the source data SDA are stored into the memory 5 during the write period WP. The next source frame blanking ends at the instant t22. The source frame synchronization instant SSI at the instant t19 indicates the next frame F3 of source data SDA which has the lines 1" to N". The first line 1" of this next frame F3 of source data SDA is again written on address L1 of the memory 5. The last line N" of this next frame F3 of source data SDA is again written on address LN of the memory 5. The source frame period SFP lasts from the instant t11 to the instant t19 and is the reciprocal of the source frame rate SFR. The frame F1 of source data SDA preceding the frame F2 comprises the lines 1 to N of source data SDA.

At the instant t13, during the frame blanking FBP, in response to the display frame synchronization instant DSI, the start address SSA of the address pointer AP2 is pointing to the first line L1 of the memory 5 to read the stored first line 1 of the source data SDA from the memory 5. This line 1 is read from the memory 5 before at the instant t14 the address pointer AP1 points to the line L1 of the memory 5 to write the first line 1' of the source data SDA into the memory 5. At the instant t15, the read period RP ends, and thus, the address pointer AP2 addresses the last line LN of the memory 5 just before the instant t15 to read the line N of the source data SDA. This line N is still stored in the memory 5 because the write process is much slower than the read process. After the read period RP an idle period ID occurs from the instant t15 to the instant t16. At the instant t16, again in response to the display frame synchronization instant DSI, the address pointer AP2 has its start address SSA and thus points again to line L1 of the memory 5. Now, the line 1' of the source data SDA is retrieved. At instant tl7, the address pointer AP1 points to the address LN of the memory 5 to store the line N' of the source data SDA. The address pointer AP2 should point to this address LN later in time at the instant t19 to be able to retrieve the line N' and not the line N from the memory 5. The next idle period ID lasts from the instant t20 to the instant t21. The address pointers AP1 and AP2 overtake each other during this idle period ID, thus outside the read period RP. Again, at the instant t21, the address pointer AP2 first reads the line 1' from the line L1 of the memory 5 before the address pointer AP1 stores the line 1" in the line L1 of the memory 5.

The offset in time OT occurring between the instants t11 and t13 and the instants t19 and t21 is now relatively small. The first frame synchronization pulse SVS shown, occurs from the instant t11 to the instant t12. The display frame period DFP lasts from the instants t13 to t16, and from the instants t16 to t21.

Figures 7A, 7B, 7C:
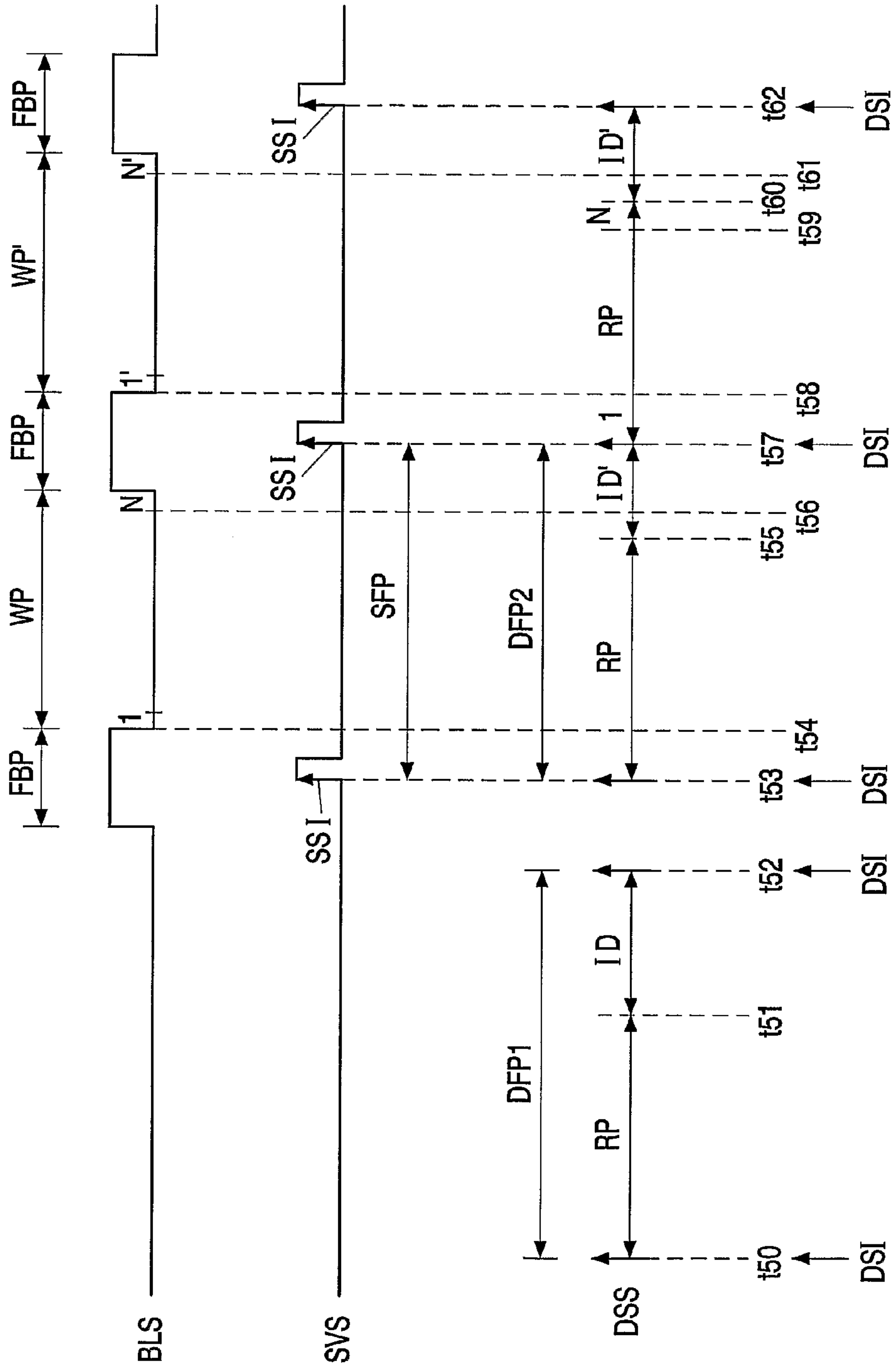
FIGS. 7A to 7C show a timing diagram elucidating the relation of the address pointers as obtained by controlling the frame rate of the display in accordance with an embodiment of the invention.

FIGS. 7A to 7C show a timing diagram elucidating the relation of the address pointers obtained by controlling the frame rate of the display in accordance with an embodiment of the invention. FIG. 7A shows a graph BLS indicating the frame blanking periods FBP of the source images. The line blanking periods are not shown. FIG. 7B shows the source frame synchronization signal SVS. FIG. 7C shows the display synchronization signal DSS.

Until the instant t52, no source data SDA is present, and the display is free running with a free running display frame period DFP1 comprising a read period RP which starts at instant t50 and lasts until instant t51 and an idle period ID which starts at instant t51 and lasts until instant t52. The start of the free running display frame periods is determined by the display frame synchronization instants DSI occurring at the instants t50 and t52.

At instant t53 a first source synchronization instant SSI occurs as indicated by the source synchronization pulse SVS. Further source synchronization instants SSI occur at the instants t57 and t62. The blanking periods FBP cover the synchronization pulses SVS. The first write period WP occurs from the instant t54 at which the first video line 1 is stored in the first line L1 of the memory 5 to somewhat later than the instant t56 at which the last video line N is stored in the last line LN of the memory 5. The second write period WP' occurs from the instant t58 at which the first line 1' is stored in the first line L1 of the memory 5 to somewhat later than the instant t61 at which the last line N' is stored in the last line LN of the memory 5.

The display frame synchronization is always reset by the source synchronization instants SSI. This means that the display frame synchronization instants DSI start with a fixed time offset (which may be substantially zero) with respect to the source synchronization instants SSI. The display frame synchronization instants DSI initiate the read periods RP to starts with a fixed time offset with respect to the source synchronization instants SSI. In FIG. 7 this time offset is selected to be zero. The duration of the read period RP should be selected more or less equal to the duration of the write periods WP and WP' such that the address pointer AP1 is always either trailing or leading the address pointer AP2 during the read periods RP. The duration of the free running display frame period DFP1 should be longer than the source frame period SFP such that, in a stable situation, the source synchronization instant SSI always occurs within one of the idle periods ID. Now, as is shown at the instants t57 and t62, in the locked state, the idle period ID is shortened to the period ID', and the display frame period DFP2 has become equal to the source frame period SFP.

At instant t57, the address pointer AP2 addresses the first line L1 of the memory to read the line 1. At the later instant t58 the address pointer AP1 addresses the first line L1 of the memory to store the line 1'. From the instant t59 to the instant t60 the address pointer AP2 addresses the last line LN of the memory to read the line N. Again, at a later instant t61 the address pointer AP1 addresses the last line LN of the memory to store the line N'. Thus during the read cycle RP lasting from instant t57 to t60, always a line 1 to N of the previous frame of the source data SDA is read before a line 1' to N' of the present frame of source data SDA is stored. The address pointers do not overtake each other and no tearing occurs.

Figures 8A, 8B, 8C:
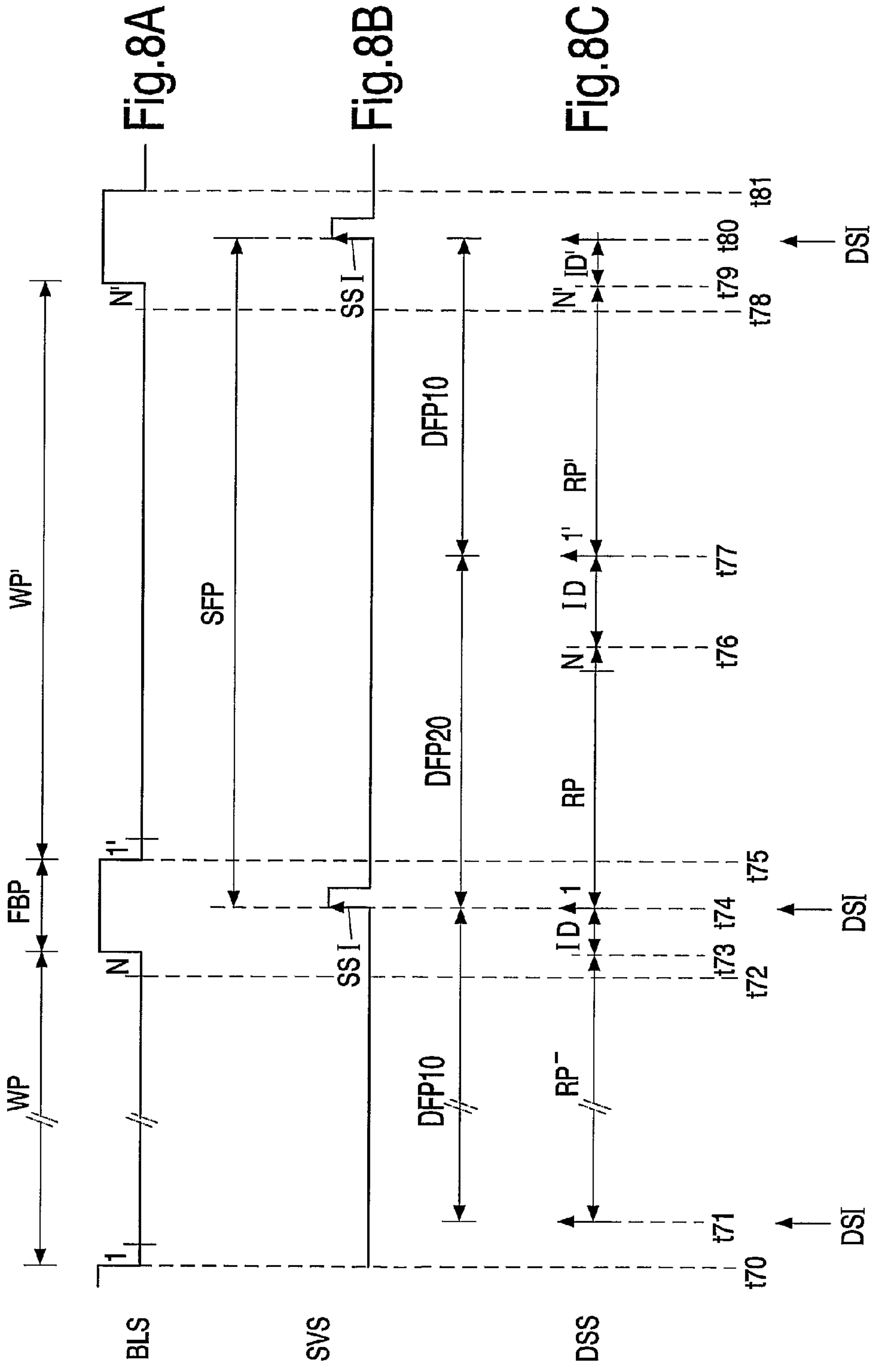
FIGS. 8A to 8C show a timing diagram elucidating the relation of the address pointers as obtained by controlling the frame rate of the display in accordance with an embodiment of the invention.

FIGS. 8A to 8C show a timing diagram elucidating the relation of the address pointers as obtained by controlling the frame rate of the display in accordance with an embodiment of the invention. In the same manner as elucidated with respect to FIG. 7, at every occurrence of a source frame synchronization instant SSI, the display frame cycle is restarted as indicated by the display frame synchronization instants DSI which immediately follow a source frame synchronization instant SSI. But now, the display frame rate DFR is substantially twice the source frame rate SFR. FIG. 8A shows a graph BLS indicating the frame blanking periods FBP of the source images. FIG. 8B shows the source frame synchronization signal SVS. FIG. 8C shows the display synchronization signal DSS.

The source frame synchronization instants SSI occur at the instants t74 and t80. The write period WP starts at instant t70 at which the address pointer AP11 points to the address L1 of the memory 5 to store the line 1 of the source data SDA and lasts until somewhat later than instant t72 at which the address pointer AP1 points to the address LN of the memory 5 to store the line N of the source data SDA. The write period WP' starts at instant t75 at which the address pointer AP1 points to the address L1 of the memory 5 to store the line 1' of the source data SDA and lasts until somewhat later than instant t78 at which the address pointer AP1 points to the address LN of the memory 5 to store the line N' of the source data SDA.

The read period RP starts at the instant t71 at which the address pointer AP2 points to the address L1 of the memory 5 and ends at the instant t73 at which the address pointer AP2 points to the address LN of the memory 5. The read period RP starts at the instant t74 at which the address pointer AP2 points to the address L1 of the memory 5 to read the line 1 of the source data SDA and ends at the instant t76 at which the address pointer AP2 points to the address LN of the memory 5 to read the line N of the source data SDA. The read period RP' starts at the instant t77 at which the address pointer AP2 points to the address L1 of the memory 5 to read the line 1' of the source data SDA and ends at the instant t79 at which the address pointer AP2 points to the address LN of the memory 5 to read the line N' of the source data SDA.

The idle period ID starts at the instant t73 and lasts until the instant t74, the idle period ID starts at the instant t76 and lasts until the instant t77, and the idle period ID starts at the instant t79 and lasts until the instant t80. The display frame period DFP10 lasts from instant t71 to instant t74. The free running display frame period DFP20 lasts from instant t74 to instant t77. The display frame period DFP10 again occurs from instant t77 until instant t80. The display frame periods DFP10 are shorter than the free running display frame period DFP20 because the source synchronization instants SSI during the idle periods ID and ID' of the display frame periods DFP10 shorten these idle periods ID and ID' while no synchronization instant SSI occurs during the idle period ID.

Again, the display frame rate DFR is controlled to obtain a free running display frame period DFP20 which is longer than the source frame period SFP which occurs between two successive source frame synchronization instants SSI. Further, the address pointers AP1 and AP2 should not overtake during the read periods RP. In the example shown in FIG. 8, at instant t74 the address pointer AP2 addresses the first line L1 of the memory 5 to retrieve the source data line 1 before at the instant t75 the address pointer AP1 points to the first line L1 to store the source data line 1'. Just before the instant t76 the address pointer AP2 points to the last line LN of the memory 5 to retrieve the source data line N still stored. At this instant t76, the address pointer AP1 is pointing to a line in the memory 5 which is in between the lines L1 and LN. At the instant t77, the address pointer AP2 again points to the first line L1 of the memory 5 in which now the line 1' is stored. At the instant t79, the address pointer AP2 again points to the last line LN of the memory 5 in which now, at the instant t78 just before the instant t79 the line N' is stored. Consequently, during the read period RP only lines 1 to N of the same source frame are read, and during the read period RP' only the lines 1' to N' of the next source frame are read and no tearing occurs.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A display method comprising:

generating images comprising source data and source frame synchronization instants having a source frame rate, storing the source data in a frame memory under control of a first address pointer having a start address being determined by the source frame synchronization instants, reading during a read period display data from the memory under control of a second address pointer having a start address being determined by display frame synchronization instants having a display frame rate, displaying the display data on a matrix display, and controlling the source frame rate or the display frame rate to obtain, in a stable situation, the first address pointer and the second address pointer starting with an offset in time which has a fixed polarity during the read period and a ratio of two between the display frame rate and the source frame rate.

2. A display system comprising:

a video source for generating images comprising source data and source frame synchronization instants having a source frame rate, means for storing the source data in a frame memory under control of a first address pointer having a start address being determined by the source frame synchronization instants, means for reading during a read period display data from the memory under control of a second address pointer having a start address being determined by display frame synchronization instants having a display frame rate, means for displaying the display data on a matrix display and means for controlling the source frame rate or the display frame rate to obtain, in a stable situation, the first address pointer and the second address pointer starting with an offset in time which has a fixed polarity during the read period and a ratio of two between the display frame rate and the source frame rate.

3. A display system as claimed in claim 2, wherein the means for controlling comprise:

means for comparing the source frame synchronization instants and the display synchronization instants or signals related thereto, and means for adapting the source frame rate or the display frame rate in response to the comparing to obtain the second pointer always lagging the first pointer during the read period in times or the other way around.

4. A display system claimed in claim 2, wherein the means for controlling comprise:

means for determining the offset in time between one of the source frame synchronization instants and one of the display frame synchronization instants succeeding each other, and means for adapting the source frame rate or the display frame rate to obtain a substantially identical source frame rate and display frame rate and a predetermined fixed value of the offset in time.

5. A display system as claimed in claim 4, wherein the means for adapting are arranged to obtain the offset in time between the first pointer and the second pointer being substantially equal to half a source write period, the source write period being the period in time required for the storing of the source data of one source frame of the source data.

6. A display system as claimed in claim 2, wherein the means for displaying the display data further comprise:

means for generating a clock signal, and means for generating the display frame synchronization instants using the clock signal, and wherein the means for controlling the display frame rate comprise means for adapting a frequency of the clock signal.

7. A display system as claimed in claim 2, wherein the means for displaying the display data further comprise:

means for generating a clock signal, means for generating line instants indicating a start of the lines of the display data using the clock signal, the line instants determining line periods, and means for generating the display frame synchronization instants using the line instants, and wherein the means for controlling the display frame rate comprise means for adapting a frequency of the clock signal to vary a duration of the line periods.

8. A display system as claimed in claim 2, wherein the means for displaying the display data further comprise:

means for generating a clock signal, means for generating line instants indicating a start of the lines of the display data by counting the clock signal, the line instants determining line periods, and means for generating the display frame synchronization instants using the line instants, and wherein the means for controlling the display frame rate comprise means for adapting the line periods by varying a number of clock pulses of the clock signal to be counted.

9. A display system method as claimed in claim 2, wherein a display frame period has a duration being an inverse of the display frame rate and comprises the means for the read period and an idle period, wherein during the read period, the means for reading are arranged for reading the display data from the memory under control of the second address pointer, and wherein during the idle period no display data is read from the memory and wherein the means for controlling the display frame rate comprises means for varying the idle time.

10. A display system as claimed in claim 2, wherein the means for controlling comprise:

means for determining the offset in time, and means for adapting the display frame rate to obtain a display frame rate being substantially identical to two times the source frame rate and to obtain a predetermined fixed offset in time, by having (i) the second pointer pointing to a first source video line of an already stored source video frame at an instant preceding the instant the first pointer is pointing to a first source video line a next source video frame to read the first source video line before the first source video line of the next source video frame is stored, and (ii) the second pointer pointing to a last source video line of the next source video frame at an instant later than an instant the first pointer is pointing to the last source video line of the next source video frame to read the last source video line of the next source video frame after it has been stored.

11. A display system as claimed in claim 2, wherein a display frame period has a duration being an inverse of the display frame rate and comprises the read period and an idle period, wherein during the read period, the means for reading are arranged for reading the display data from the memory under control of the second address pointer, and wherein during the idle period no display data is read from the memory and wherein the means for controlling comprise: means for setting a free running display frame rate to a value lower than the value of the source display frame rate wherein a duration of the read period is shorter than a source frame period, and means for restarting the display frame periods in response to received source synchronization instants.

* * * * *